United States Patent [19]

Akens et al.

[11] Patent Number: 5,395,415
[45] Date of Patent: Mar. 7, 1995

[54] METHOD AND APPARATUS FOR CONVEYING AND SHAPING GLASS SHEETS

[75] Inventors: Jody H. Akens, Plantation, Fla.; Robert J. Boisselle, Toledo, Ohio

[73] Assignee: Libbey-Owens-Ford Co., Toledo, Ohio

[21] Appl. No.: 166,221

[22] Filed: Dec. 13, 1993

[51] Int. Cl.⁶ ............................................. C03B 23/033
[52] U.S. Cl. ...................................... 65/106; 65/107; 65/273
[58] Field of Search ................. 65/104, 106, 107, 245, 65/253, 255, 273, 268

[56] References Cited

U.S. PATENT DOCUMENTS

| | | | |
|---|---|---|---|
| 3,545,951 | 12/1970 | Nedelec | 65/104 |
| 4,575,389 | 3/1986 | Halberschmidt et al. | 65/273 |
| 4,586,946 | 5/1986 | Kramer et al. | 65/273 |
| 4,773,925 | 9/1988 | Schultz | 65/106 |
| 4,853,019 | 8/1989 | Blank et al. | 65/106 |
| 5,201,928 | 4/1993 | Dicks et al. | 65/106 |

Primary Examiner—Joye L. Woodard
Attorney, Agent, or Firm—Marshall & Melhorn

[57] ABSTRACT

A method of and apparatus for precisely shaping heated glass sheets as the sheets advance along a bed of conveyor rolls. The conveyor rolls comprise a core member having axially aligned opposite sections and an arcuately curved central portion, with a flexible sleeve surrounding the core member. The sleeves are rotated in unison about the core members to convey the sheets. The core members are pivotable in unison between a first position where the curved control portions lie in a common plane for conveying the flat sheets and a second, lowered position whereat the curved portions define the shape to which the sheets are to be deformed. Vertically reciprocable top surface press units are mounted above the path of the glass sheets. The press units include curved stationary mandrels having freely rotatable flexible sleeves thereon. The configurations of the mandrels are such that in operative position the mid portion of the mandrel of the first press unit is slightly close to the path defined by the conveyor rolls than the edge portions, and the edge portions of the second mandrel are slightly closer to the path than the mid portion.

25 Claims, 3 Drawing Sheets

METHOD AND APPARATUS FOR CONVEYING AND SHAPING GLASS SHEETS

BACKGROUND OF THE INVENTION

1. Field of the Invention

The present invention pertains broadly to the shaping of heated glass sheets, and more particularly to the shaping of such glass sheets while being conveyed upon a series of specially configured, pivotable conveyor rolls beneath correspondingly configured reciprocable top rolls.

2. Description of the Prior Art

In mass producing curved or bent glass sheets employed as glazing closures for automobiles and the like, glass sheets are commonly advanced along a horizontal path on roll-type conveyors successively through a heating area, a bending area and a heat treating area for annealing or tempering the bent or shaped sheets. As the sheets advance through the heating area they are gradually heated to approximately the softening temperature of the glass, and then quickly advanced into the bending area for shaping to the desired configuration. Following bending, the shaped sheets which are to be tempered are quickly advanced into a tempering area between opposed blastheads and subjected to opposed high-velocity streams of cooling air directed against their opposite major surfaces.

In accordance with one widely used process for producing such shaped sheets, the heated sheets are advanced from the heating furnace into the bending area and accurately located therein between complemental upper and lower shaping members by locating stops positioned in the path of an advancing sheet for engaging the leading edge thereof. The sheet is then engaged around its peripheral marginal edge portion by a lower press member and lifted from the conveyor rolls into engagement with an upper complemental press member for press bending to the desired configuration. Upon completion of bending the lower press member is retracted to deposit the bent or shaped sheet upon the conveyor rolls for advancement into and through the tempering area.

As the sheet is advanced into the bending area its movement is stopped by engagement with the locating stops. The conveyor rolls continue to rotate, and even if lifting of the sheet begins simultaneously with interruption of the advancement, the heated central portion of the sheet inwardly from the press member-contacting peripheral margins will sag somewhat to remain in contact with the rotating conveyor rolls for a brief period. The resulting frictional contact can mar the surface of the hot glass and cause an objectionable optical defect known as "roll distortion". In order to alleviate this problem a system was devised, as disclosed in U.S. Pat. No. 3,905,794, wherein a series of rolls having arcuately curved central portions is provided within the bending apparatus. The rolls are pivotable in unison between a first position whereat the central portions lie in a common horizontal plane for conveying the flat sheet, and a second position whereat the central portions are out of engagement with the sheet and at an angle to the horizontal plane. An improvement to the actuator mechanism for adjusting the angular attitudes of the rolls is described in U.S. Pat. No. 4,015,968. While the devices somewhat alleviated the above-noted problem of roll distortion, they still required interruption of the advancement of each sheet and subsequent acceleration of the bent sheet from a static position. The stopping, lifting, lowering and accelerating not only create opportunities for formation of optical defects such as roll distortion, but the procedure is also time consuming so as to result in an extended cycle time for the bending of each sheet.

It has also been proposed to shape glass sheets by a so-called roll forming process wherein the heated sheets are passed between opposed rolls having complementary configurations defining a pass therebetween which bends the sheets to the desired shape. Such devices are disclosed, for example, in U.S. Pat. Nos. 3,545,951, 3,701,644, 4,381,933 and 4,556,406. However, none of the devices has proven entirely satisfactory in shaping glass sheets at the rates and with the optical quality necessary for modern day production lines.

SUMMARY OF THE INVENTION

Accordingly, it is a primary object of the present invention to provide an improved method and apparatus for roll forming shaped glass sheets.

It is another object of the invention to provide such a method and apparatus wherein roll distortion of the shaped glass sheets is minimized.

Another object of the invention is to provide such a method and apparatus wherein the sheets advance through the forming area without interruption.

Still another object of the invention is to provide such a method and apparatus wherein contact with the top surface of the sheets during forming is minimized.

To those ends, in accordance with the invention a series or bed of pivotably mounted conveyor rolls is located in the bending apparatus for receiving heated glass sheets from an adjacent furnace. The conveyor rolls comprise core members having arcuately curved central portions, with flexible sleeves surrounding the core members. The sleeves are rotated about the core members for advancing the glass sheets. The conveyor rolls are pivotable in unison between a first position whereat the curved central portions lie in a common plane for supporting and conveying a flat glass sheet, and a second position whereat the central portions lie in planes extending at angles to the horizonal plane. In the second position the central portions define a conveyor path having the shape to which the sheets are to be deformed.

When a heated sheet moves into position over the leading end of the bed of pivotable rolls in their first position, the rolls pivot to their second position. As the heated sheet advances it sags into approximate conformity with the path defined by the arcuately curved central portions. Vertically reciprocable top surface press units are positioned above the path of the glass sheets at the trailing end of the bed of pivotable lower rollers. The press units may comprise mandrels having arcuately curved central portions upon which flexible sleeves are mounted for free wheeling rotation in response to frictional engagement with the moving glass sheets, or the sleeves may be driven at a peripheral speed consistent with the moving sheets. The press units are mounted upon a platen for selective vertically reciprocating movement toward and away from the path of movement of the glass sheets upon the lower rollers. As the bed of pivotably mounted rollers pivot downwardly to permit a glass sheet to sag bend, the press units descend to their lowered position proximate the downwardly pivoted rollers. The arcuately curved central portion of the leading one of the press units has a radius of curvature slightly smaller than the radius of curvature of the central portion of the pivotable rolls. The press units are vertically positioned so that the mid portions of the lower rolls and leading press unit are spaced apart a distance approximately equal to the thickness of the sheets. As the sheets pass between the leading press unit and lower roll it is pressed downwardly at the center into conformity with the arcuately configured lower rolls. The arcuately curved central portion of the trailing one of the press units has a radius of curvature slightly greater than that of the central portion of the pivotable rolls. The trailing upper press unit thus engages the glass sheets along the marginal edges and urges the marginal edges against the lower rolls to eliminate upward curling of the edges. As the shaped sheet leaves the shaping area the lower rolls are pivoted to their horizontal position and the press units are raised in readiness for the succeeding flat sheet.

BRIEF DESCRIPTION OF THE DRAWINGS

In the drawings, wherein like numerals refer to like parts throughout.

DESCRIPTION OF THE PREFERRED EMBODIMENT

Figure 1:
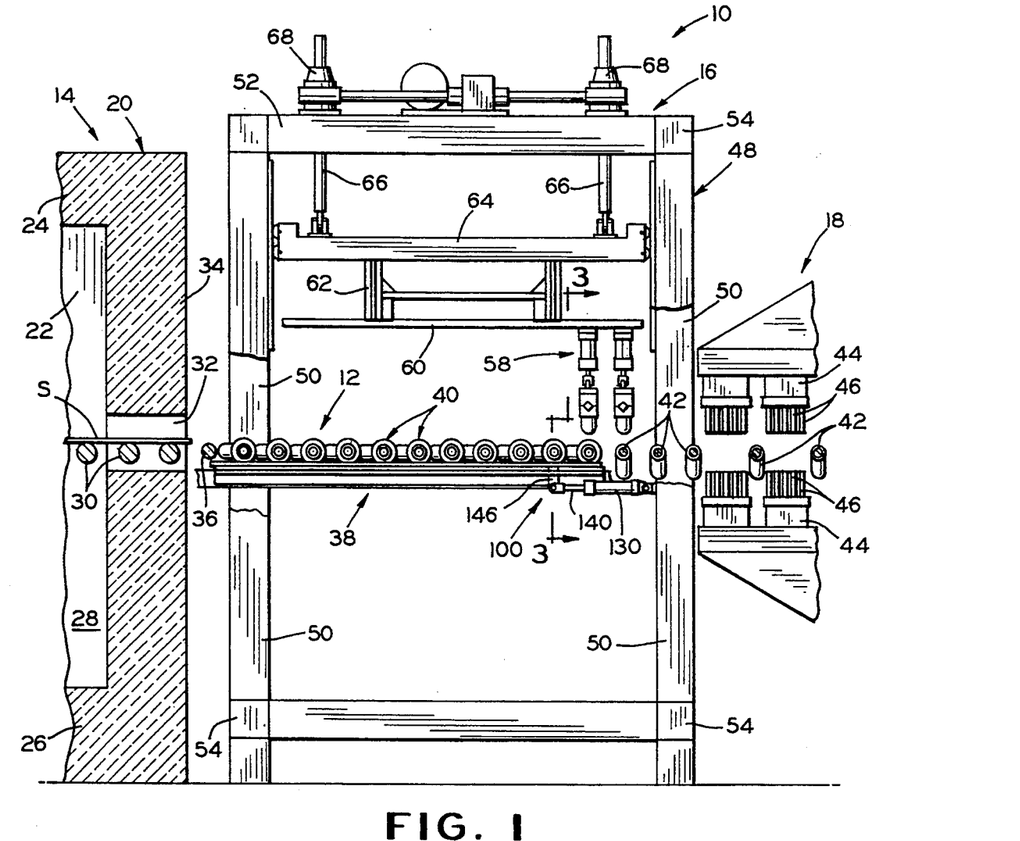
FIG. 1 is a side elevational view of a roller bending system embodying the invention positioned between glass heating and tempering sections.

Referring now to the drawings, and in particular to FIG. 1 thereof, there is shown generally at 10 a glass sheet conveying and shaping apparatus embodying the invention. The apparatus more particularly comprises a continuous conveyor system 12 along which glass sheets S are conveyed one after another successively through a heating section 14, a bending or shaping section 16 and a thermal conditioning section 18. The heating, shaping and thermal conditioning sections are contiguous so that the sheets pass immediately from one section to the succeeding section.

The heating section 14 may conventionally comprise a tunnel-type furnace 20 including a heating chamber 22 defined by a top wall 24, a bottom wall or floor 26 and opposite side walls 28, formed of a suitable refractory material. The heating chamber 22 may conventionally be heated by suitable heating means such as electrical resistance heating elements or gas fired burners (not shown) located in the top and side walls of the furnace. The sheets S are advanced through the heating chamber upon a series of conveyor rolls 30 which comprise a part of the conveyor system 12 and which extend throughout the length of the heating chamber from the entrance to the exit end thereof.

The sheets are heated to substantially the softening point of the glass in moving through the heating chamber 22, and the heated sheets then emerge from the furnace 20 through an opening 32 in an end wall 34 thereof. Upon emerging from the furnace the heated sheets may pass over one or more intermediate conveyor rolls 36 and then are immediately received upon a shaping bed 38 comprised of a series of individual drop rolls 40 within the bending station as will be hereinafter described. Following shaping within the bending station 16, the advancing sheets are received upon curved conveyor rolls 42 for movement into and through the thermal conditioning station 18. The rolls 36, 40 and 42, along with the rolls 30, comprise the conveyor system 12.

As illustrated in FIG. 1, the thermal conditioning system 18 through which the bent sheets S are conveyed upon the rolls 42 comprises tempering apparatus wherein the temperature of the glass sheets is rapidly reduced to produce a desired degree of temper in the glass. To that end, the thermal conditioning station includes upper and lower blastheads 44 positioned above and below the path of the advancing sheets. The blastheads include nozzles 46 for directing opposed streams of cooling fluid such as air or the like against the opposite surfaces of the sheets S advancing along the path, at relatively high velocity.

Figure 3:
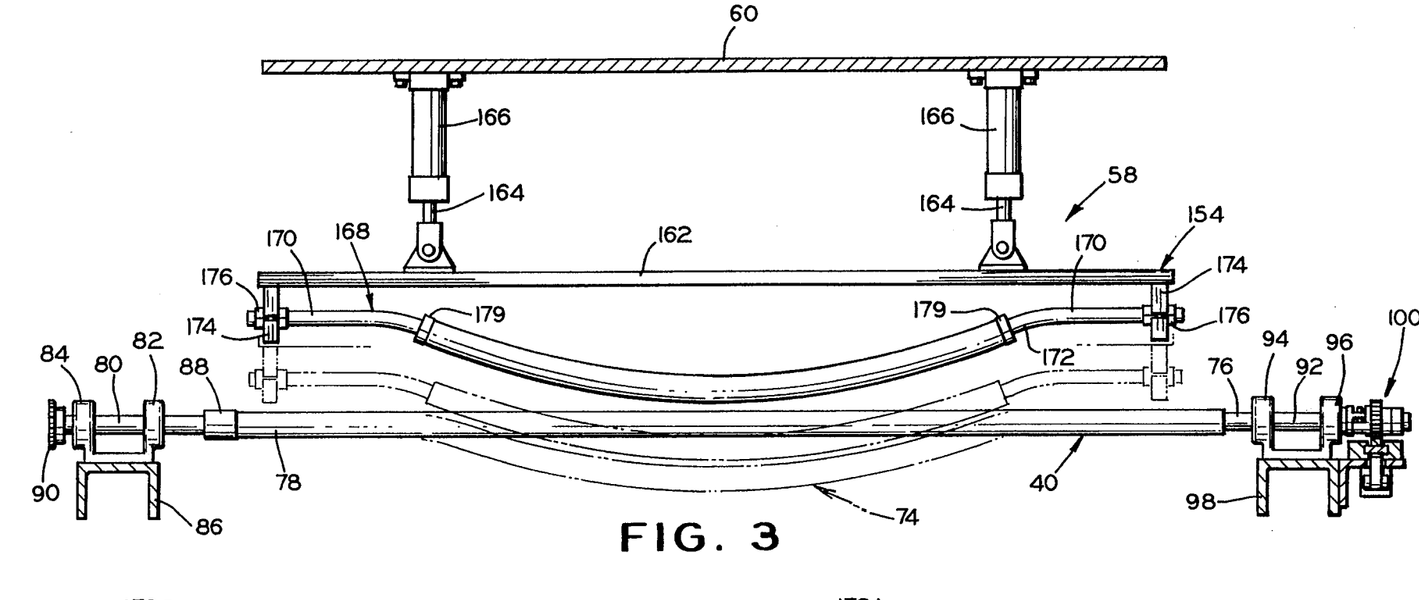
FIG. 3 is an enlarged, fragmentary, transverse elevational view taken substantially along line 3—3 of FIG. 1.

The bending or shaping station 16 comprises a skeletal framework 48, generally of rectangular parallelpiped form, including upstanding corner posts 50, interconnected at their top and bottom by longitudinal beams 52 and transverse beams 54 to form a rigid box-like structure. The rolls 40 of the forming bed 38, as best seen in FIG. 3 and as will be hereinafter more fully described, are operatively mounted upon longitudinally extending side rails 56 suitably carried by the framework 48. The intermediate roll 36, as well as the curved rolls 42, may likewise be operatively mounted upon the side rails.

A vertically reciprocable bending assist unit 58 is positioned within framework 48 above the path of the sheets. The unit 58 is carried upon a base plate 60 which in turn is mounted by a suitable framework 62 upon a platen frame 64. The platen frame is preferably vertically adjustable within the framework 48 in order to accommodate glass parts bent to different degrees of curvature and of different thicknesses. Accordingly, the platen frame 64 is operatively connected adjacent each of its corners within the framework 48 to the lower ends of screw jack rods 66 of associated screw jacks 68 carried on a framework comprised by the beams 52 and 54 atop the framework. A motorized drive unit 69 carried atop the framework is adapted to drive the screw jacks in unison for selectively retracting or extending the rods 66 to correspondingly raise or lower the platen frame 64 and the bending assist unit 58 carried thereby.

Figure 2:
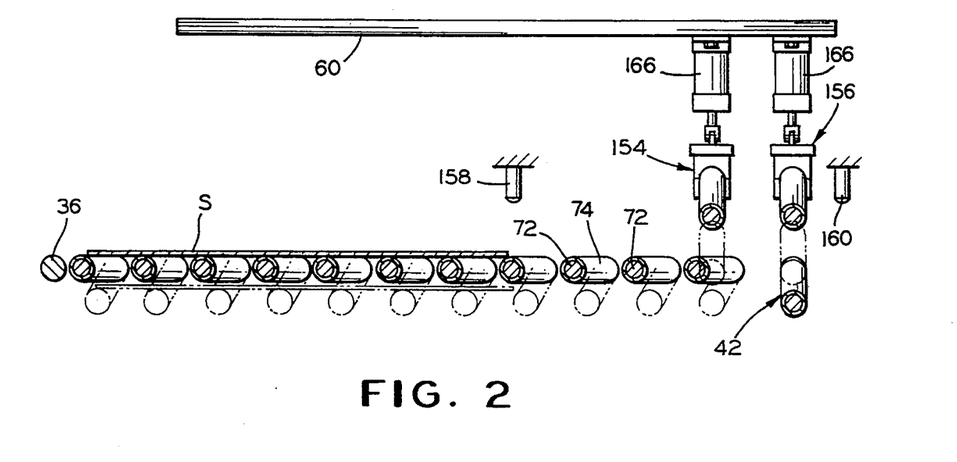
FIG. 2 is an enlarged, fragmentary, longitudinal elevational view of the roll bed and upper press units.

The rolls 40 comprising the shaping bed 38 are constructed and configured to provide a flat, horizontal bed as seen in FIG. 2 for conveying a heated sheet from the furnace 20 into the bending station 16. When the trailing edge of the sheet has advanced over the initial one of the rolls 40 comprising the shaping bed 38, the rolls are pivoted to an alternate position whereat they provide a curved conveyor bed with which the heated sheet tends to sag into conformity as it advances along the bed. To that end, each of the conveyor rolls 40 in the preferred embodiment comprises straight, axially aligned opposite end portions 70 and 72 interconnected by an arcuately curved central portion 74.

The construction and operation of the shaping bed 38 and the rolls 40 may, for example, be of the type described and illustrated in the aforementioned U.S. Pat. No. 4,015,968, the disclosure of which is incorporated herein by reference. Thus, each of the rolls 40 includes an inner, hollow, normally stationary core member or mandrel 76 and an outer, flexible, load carrying sleeve 78 surrounding and freely rotatably about the core member. The sleeve is drivingly rotated about the core member for carrying the glass sheets, and may advantageously comprise a liner formed of a suitable low friction material, for example a fluorocarbon resin, covered with a layer of stainless steel mesh for reinforcing and preventing kinking of the low friction material. The sleeve is thus flexible for conforming to the arcuate shape of the inner core 76, and is capable of transmitting torque without significant axial twisting or distortion. The sleeve may be covered with an asbestos or fiberglass material to provide a resiliently yieldable, heat resistant surface which will not mar the surface of heated sheets received thereon.

At one end of the curved or contoured rolls 40 the core member 76 telescopically receives a stub shaft (not shown) which is fixed to the core member and concentrically journalled within a rotatable collar 80. The collar 80 is journalled for rotation in a pair of spaced bearings 82 and 84 carried by a side rail 86 of the structural framework of the apparatus. The end of the sleeve 78 is attached to the rotatable collar 80 by a coupling member 88 secured on the collar. The other ends of the sleeves 78 are left free, for free rotation about their associated core member 76. A sprocket 90 affixed to the collar 80 is adapted to be drivingly engaged as by an endless drive chain (not shown). The drive chain may engage a sprocket 90 on each of the curved rolls 40 to thus rotate the collars 80 about the stationary stub shafts affixed to the core members 76 and, in turn, rotate the coupling members 88. Rotation of the coupling members causes the outer sleeves 78 to rotate about the core members 76 in unison at the same angular speed about their respective chordal axes.

The end of each core member 76 remote from the collar 80 is suitably connected to a rotatable drive shaft 92 journalled in spaced bearings 94 and 96 carried on a longitudinal side rail 98 of the conveyor system. The shaft 92 of each of the rolls 40 is operatively coupled to a roll pivoting or shifting mechanism, identified at 100. In accordance with the invention, the sleeves 78 are rotatably driven about the core members 76 in unison for advancing the glass sheets into and through the bending or shaping station 16, and the core members are mounted as well for pivoting movement in unison between a first position in which the central curved portions 74 lie in a common horizontal plane as shown in solid lines in FIG. 2, and a second position at which the central curved portions lie in a lowered or dropped position as illustrated in broken lines in FIG. 2. In the latter positions the curved portions 74 conjointly comprise a curved support bed defining the curvature to be imparted to the glass sheets.

Figure 6:
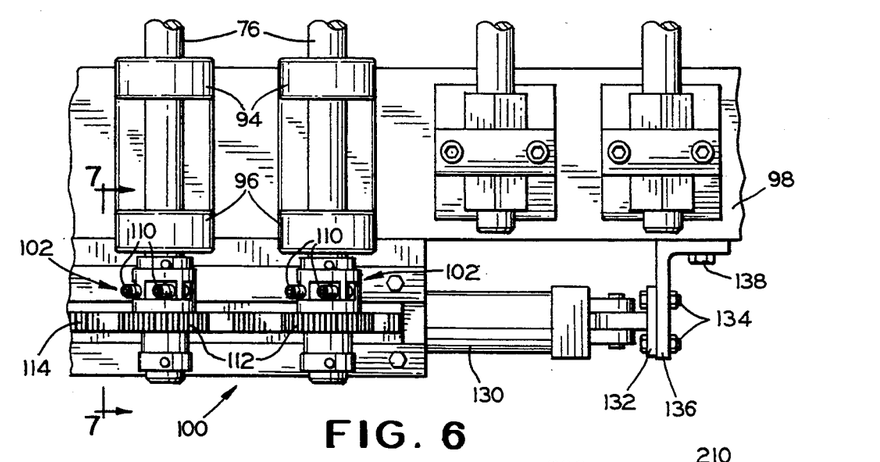
FIG. 6 is an enlarged fragmentary top plan view of the pivoting mechanism for the pivotable conveyor rolls.
Figures 7, 9:
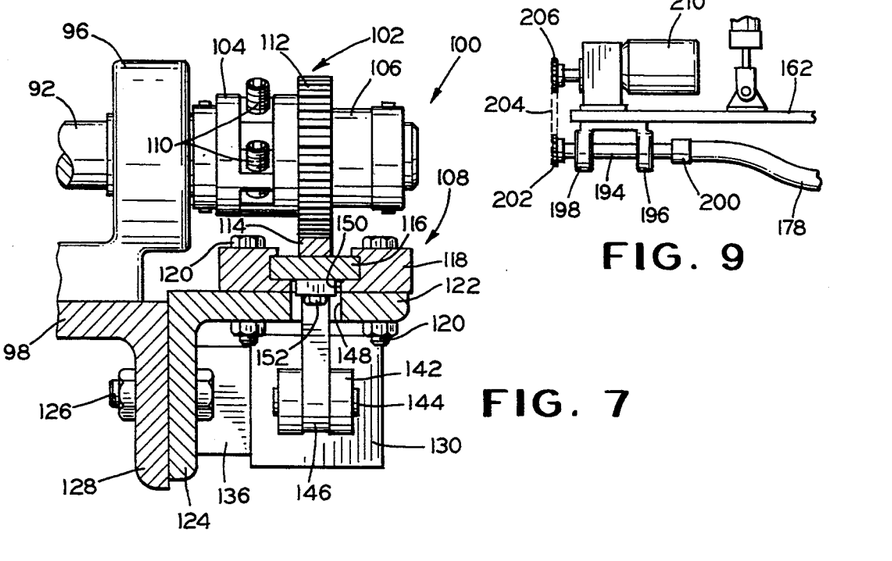
FIG. 7 is an enlarged vertical section taken substantially along line 7—7 of FIG. 6.
FIG. 9 is a fragmentary transverse elevational view illustrating a drive mechanism for the sleeve of a press unit.

In addition to being mounted for pivoting movement in unison, it is desirable that provision be made for adjusting the angular position of the individual rolls relative to one another for maintaining the core members in the desired angular relationship. To that end the roll shifting mechanism 100, as best seen in FIGS. 6 and 7, comprises a two-piece coupling 102 including a first coupling section 104 secured to the drive shaft 92 and a second coupling section 106 operatively connected to a drive unit, shown generally at 108. Reference may be had to the aforementioned patent for details of the internal construction of the two piece coupling. As explained therein, the two part coupling is constructed to include threaded adjusting screws 110 which can be manipulated to angularly orient the coupling sections 104 and 106 within limits, relative to one another.

A pinion gear 112 suitably secured to the second coupling section 106 includes teeth operatively intermeshing with the teeth of a gear rack 114 affixed to the upper face of a slide bar 116. The slide bar is mounted for axial sliding movement in a guide block 118 affixed by suitable fasteners such as bolts 120 to the horizontally extending leg 122 of an angle member 124. The angle member is secured as by bolts 126 to one leg 128 of the associated side rail 98. The slide bar 116 and gear rack 114 thereon are selectively moved axially along the guide block 118 as by means of a fluid actuated cylinder 130. The cylinder 130 is pivotally connected at its head end to a lug 132 affixed as by bolts 134 to an angle bracket 136 counted by bolts 138 to the vertical leg 128 of the side rail 98. The cylinder conventionally includes a reciprocable piston (not shown) driving a piston rod 140. The piston rod, in turn, is connected by a yoke 142 and pin 144 to an operating arm 146. The operating arm extends through vertically aligned longitudinally elongated slots 148 and 150 within the horizontal leg 122 and the guide block 118, respectively for connection as by stud bolts 152 to the slide bar 116. Thus as best seen in FIGS. 1 and 2, with the piston rod 140 in its extended position the gear rack 114 will be in its extended, leftmost position whereat the central curved portions 74 of the curved rolls 40 are disposed in their upper, horizontal positions as shown in solid lines in FIG. 2. Upon retraction of the piston rod, the slide bar 116 and gear rack 114 move axially toward the fight, rotating the pinion gears 112 of the several curved rolls 40 in unison in a counter-clockwise direction. The curved central portions 74 accordingly swing from the upper horizontal position to a lower angularly disposed position, that is, from the position shown in full line to the position shown in broken line in FIG. 2.

The bending assist unit 58 comprises at least first and second top surface press units 154 and 156, respectively, beneath which the advancing sheets S pass in succession upon the drop rolls 40 and conveyor rolls 42. The press units are adapted to reciprocally cycle up and down in timed relation with the pivoting of the curved rolls 40 in order to avoid interference between the curved portions of the rolls and press units. To that end, in order to detect the position of a sheet and initiate the cycling of the rolls 40 and top surface press units 154 and 156 without interrupting advancement of the sheet, suitable detectors 158 and 160 such as limit switches or conventional photoelectric units may be positioned to detect arrival of the leading edge and departure of the trailing edge, respectively, of a glass sheet S within the shaping station 16.

The top surface press units 154 and 156 may be of generally identical construction except for the configuration of the sheet contacting members as will be hereinafter described. Thus, as best seen in FIGS. 2 and 3, each of the press units 156 and 158 includes a mounting bar 162 extending transversely above the shaping bed 38. The mounting bars are suitably affixed to piston rods 164 of a spaced pair of fluid actuators 166 suspended from the base plate 60. A stationary mandrel 168 having axially aligned end sections 170 interconnected by an arcuately curved central portion 172, is affixed at its opposite ends to the mounting bar 162 as by suitable two part clamps 174. As will be hereinafter explained, the central portion 172 of the press units 154 and 156 have slightly different curvatures and are designated accordingly in FIGS. 4 and 5 as 172a and 172b, respectively. The clamps secure the mandrel against rotation, with the curved central portion 172 in a predetermined angular attitude, generally lying in a vertical plane, as by engaging square collars 176 fitted on the end sections 168. A sleeve 178 of a type similar to the sleeve 78 on the core member 76 is fitted over the curved central portion 168 of the mandrel for free rotation thereabout in response to frictional engagement with the upper surface of a glass sheet advancing therebeneath or by suitable drive means as will be hereinafter described. Collars 179 may be provided on the mandrel at either end of the sleeve for maintaining the axial position of the sleeve as it rotates on the mandrel.

By controllably extending and retracting the piston rods 164, the mounting bar can be correspondingly advanced toward and retracted away from the path of the glass sheets S along the shaping bed 38 and into the thermal conditioning station 118. In operation, as a heated glass sheet S moves into proper position as indicated by the detector 158 or other appropriate cycle-initiating device, the piston rod 140 of the shifting mechanism 100 retracts to pivot the drop rolls 40 and move the curved portions 74 from the horizontal solid line position of FIGS. 2 and 3 to the lowered position shown in broken lines.

The sheet, heated to its softening paint, tends to sag into conformity with the arcuately curved central portions 74 of the sleeves 78 upon which it is being supported and conveyed. It has been found, however, that while the sheet progressively sags into conformity with and comes to rest upon the rolls from the longitudinal edges toward the central portion, that is, as the unsupported portion of the sheet decreases, a point may be reached at which the sagging or bending becomes very slow or even stops. As a result, a gap remains between the mid portion of the sheet and the adjacent mid portion of the sleeve 78, and the curvature of the sheet does not conform precisely to that of the curved roll portions 74.

Figure 4:
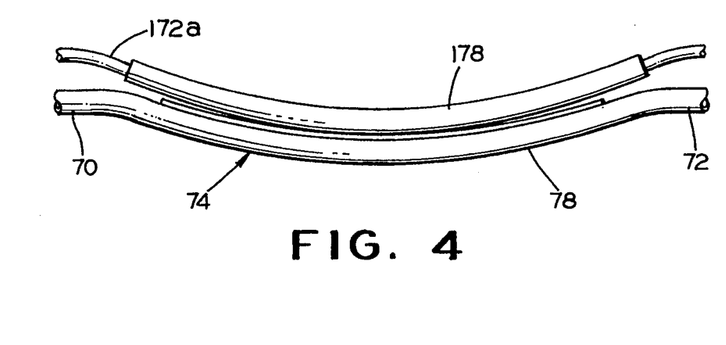
FIG. 4 is an elevational view illustrating the leading top press unit in rolling engagement with a glass sheet advancing on the lower rolls.

In order to urge the mid portion of the sheet downwardly into engagement with the sleeve 78, the curved central portion 172a of the stationary mandrel 168 of the top press unit 154 is formed with a somewhat greater degree of curvature than that of the corresponding sections 74 of the drop rolls 40. Thus, as illustrated in FIG. 4, when the press unit 154 is lowered into operative position the mid portion of the sleeve 178 will be spaced above the path defined by the lower rolls by a distance equal to or slightly greater than the thickness of the sheets S. The ends of the curved portion will be spaced somewhat further from the lower rolls. As a sheet advances beneath the press unit 154, if the mid portion has not previously sagged into conformity with the lower rolls its top surface will be engaged by the sleeve 178 in that region and the sheet will be urged downwardly into conformity with lower rolls. Since the spacing between the top surface press unit and lower drop rolls increases from the mid region toward the edges, only the portion of the sheet which has not sagged sufficiently will be engaged by the sleeve of the press unit, thereby minimizing potential damage to the glass surface. The sleeve 178 rotates freely about the mandrel 168 in response to contact with the advancing sheet so that abrasive damage to the contacted sheet surface is likewise minimized.

Figure 5:
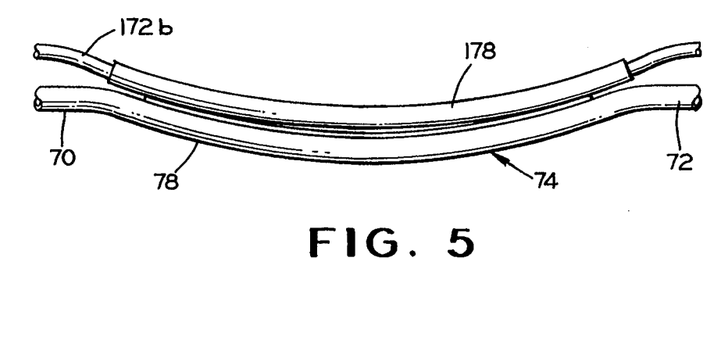
FIG. 5 is an elevational view similar to FIG. 4, illustrating the trailing top press unit in rolling engagement with a glass sheet advancing on the lower rollers.

As the mid region of the sheet is urged downwardly by the press unit 154 and the sheet advances beyond the first press unit, the opposite longitudinal marginal edge areas of the sheets have been found to have a tendency to curve upwardly and away from the lower drop rolls 40. This tendency is believed due to a so-called spring-back effect resulting from the depressing of the mid region and the tendency of the lower surface of the sheet to lose heat at a slower rate than the top surface because of its contact with the rollers 40. In order to urge the marginal edges of the sheet down onto the curved conveyor rolls 40 and/or 42, the mandrel 168 of the second top surface press unit 156 is provided with a curved central portion 172b having a degree of curvature somewhat greater than that of the corresponding portion of the rolls 40 and/or 42. Thus, as illustrated in FIG. 5 with the top press unit 156 in the lowered position, the sleeve 178 will be spaced from the lower sleeve 78 a distance equal to or slightly greater than the thickness of the sheet S along its marginal longitudinal edges and a somewhat greater distance in the mid region. The sleeve 178 will thus urge the marginal edges downwardly into conformity with the curved path defined by the lower rollers 40 and 42, without adversely affecting the optical quality of the top surface of the sheets.

The illustrated embodiment utilizes single top surface press units 154 and 156 disposed vertically above the last of the rolls 40 and the first of the rolls 42, respectively. It will be understood that either of the press units 154 and 156 might be employed without the other, and that a plurality of either or both of the units might be employed in various combinations. Likewise, the press units may as well be positioned at other and different locations above the rolls 40 and 42, both in vertical alignment with and offset from the rolls 40 and 42.

Figure 8:
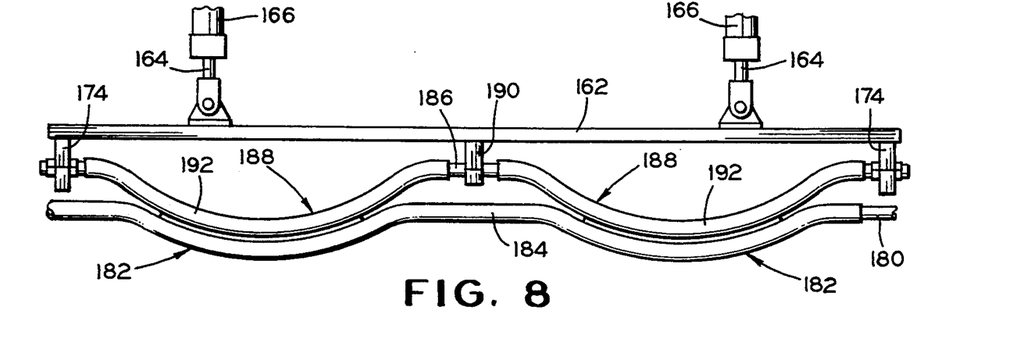
FIG. 8 is a transverse elevational view similar to FIG. 3, illustrating an alternate embodiment of the invention.

In order to increase the production rate of such bending facilities, particularly in the bending of smaller glass parts such as quarter lites and small side lites for automobiles, the parts can be conveyed through the facility side-by-side in pairs. There is shown in FIG. 8 an alternate embodiment of the invention particularly adapted to such production. Thus, the drop rolls 40 and conveyor rolls 42 include a core member 180 formed with a spaced pair of curved portions 182. A continuous sleeve 184 surrounds the core member and is mounted and driven similarly to the sleeves 78. The top surface press units 154 and 156 comprise a stationary mandrel 186 likewise formed with a spaced pair of curved portions 188. The mandrel is supported at the middle on the mounting bar 162 by an additional two part clamp 190. Separate, freely rotatable sleeves 192 are provided on the curved portions 188 of the mandrel, so that two sheets S may be advanced through the facility simultaneously in side-by-side relationship.

While in most instances the sleeve 178 or sleeves 192 may simply be mounted for free rotation in response to engagement with the surface of the advancing glass sheet, in certain situations it may be desirable to drive the sleeve or sleeves at a peripheral speed consistent with that of the glass sheets. To that end as illustrated by the alternate embodiment of FIG. 9, the top surface press units may be provided with a sleeve drive mechanism similar to that of the lower drop rolls 40. Thus, the mandrel 168 or 186 may include a stud shaft (not shown) fixed to the mandrel or core member and concentrically journalled within a rotatable collar 194. The collar is journalled for rotation in a pair of spaced bearings 196 and 198 carried by the mounting bar 162. The end of the sleeve 178 or 192 is attached to the rotatable collar 194 by a coupling member 200 secured on the collar. A sprocket 202 affixed to the collar is engaged by a drive chain 204 trained about a drive sprocket 206 of a suitably controlled motor and a car reduction unit 210. As will be readily understood, the sleeve 178 or 192 may thus be driven in synchronism with the sleeves of the lower drop rolls.

In operation, glass sheets S are advanced through the furnace 20 one after another, or side by side in pairs in accordance with the alternate embodiment of FIG. 8, in a suitably controlled manner so as to exit the furnace at a predetermined temperature suitable for shaping within the shaping station 16. The curved rolls 40 of the shaping bed 38, in their normal raised position as shown in solid line positions in FIG. 2, receive the heated sheet from the furnace and advance it along the shaping bed until it reaches a predetermined position as determined by the leading edge detector 158 or other suitable position sensing device. The piston rod 140 is then retracted by the cylinder 130 to retract the gear rack 114 and pivot the core members 76 of the curved rolls 40 to their lowered, broken line position as shown in FIG. 2. The reciprocable bending assist unit 58 is previously set at the desired height by means of the screw jacks 68. When the curved rolls 40 are manipulated to their lowered positions, the top surface press units 154 and 156 are lowered into operative position by extending the piston rods 164 of the fluid actuators 166.

As the curved central portions 74 of the rolls 40 pivot to their lowered positions, the heated sheet S being conveyed thereon tends to sag under the influence of gravity toward the curved portions and assume a bent configuration approximating that of the curved portions. The bent sheet then passes successively beneath the rotatable sleeves 178 on the curved central portions 172a and 172b, which insure first that the mid region and then the opposite longitudinal marginal edge regions of the sheet assume the configuration of the curved central portion 74 of the rolls 40. After the trailing edge of the sheet passes a predetermined point as noted by the detector 160, the rolls 40 are returned to their upright positions and the top surface press units 154 and 156 are raised in readiness for reception of the next sheet from the furnace and repetition of the cycle.

It is to be understood that the forms of the invention herewith shown and described are to be taken as illustrative embodiments of the same, and that various changes in the shape, size and arrangement of parts, as well as various procedural changes, may be resorted to without departing from the spirit of the invention.

What is claimed is:

1. A method of roll forming glass sheets to a predetermined configuration including the steps of heating a flat sheet of glass to the softening point thereof, advancing the heated sheet in a substantially horizontal plane on a series of conveyor rolls having arcuately shaped supporting portions lying in a common horizontal plane at a first position, pivoting the conveyor rolls to a second lowered position whereat the arcuately shaped portions define a supporting path having the predetermined configuration, whereby the advancing sheet sags toward the arcuately shaped portions into a partially shaped configuration and, while advancing the partially shaped sheet on the arcuately shaped portions, applying downwardly directed force against the mid region of the top surface of the sheet to urge the mid region of the sheet into engagement with the arcuately shaped portions, including advancing the sheet beneath a first arcuately shaped press member for applying the downwardly directed force, wherein the first arcuately shaped press member is substantially coextensive with the arcuately shaped portions of the rolls and has a degree of curvature greater than the degree /f curvature of the arcuately shaped portions of the rolls.

2. A method of roll forming glass sheets as claimed in claim 1, wherein the first press member rollingly engages the top surface of the sheet.

3. A method of roll forming glass sheets as claimed in claim 2, wherein the first press member includes a freely rotatable flexible sleeve surrounding a stationary mandrel, said sleeve rotating freely in response to frictional engagement with the top surface of the advancing sheet.

4. A method of roll forming glass sheets as claimed in claim 2, wherein the first press member includes a flexible sleeve surrounding and rotatable about a stationary mandrel, including the step of driving the Sleeve at a peripheral speed synchronized with the rate of advance of the heated sheets on the conveyor rolls.

5. A method of roll forming glass sheets as claimed in claim 1, including the step of applying downwardly directed forces against the longitudinal marginal edge portions of the top surface of the advancing sheet following application of the force against the mid region to urge the marginal edge portions into engagement with the arcuately shaped supporting portions.

6. A method of roll forming glass sheets as claimed in claim 5, including advancing the sheet beneath a second arcuately shaped press member for applying the downwardly directed forces against the marginal edge portions.

7. A method of roll forming glass sheets as claimed in claim 6, wherein the second press member rollingly engages the marginal edge portions of the top surface of the sheet.

8. A method of roll forming glass sheets as claimed in claim 7, wherein the second press member includes a freely rotatable sleeve surrounding a stationary mandrel, said sleeve rotating freely in response to frictional engagement with the top surface of the advancing sheet to apply the downwardly directed forces along the longitudinal marginal edge portions of the advancing sheet.

9. A method of roll forming glass sheets as claimed in claim 7, wherein the second press member includes a sleeve surrounding and rotatable about a stationary mandrel, including the step of driving the sleeve of the second press member at a peripheral speed synchronized with the rate of advance of the heated sheets on the conveyor rolls.

10. A method of roll forming glass sheets to a predetermined configuration including the steps of heating a flat sheet of glass to the softening point thereof, advancing the heated sheet in a substantially horizontal plane on a series of conveyor rolls having arcuately shaped supporting portions lying in a common horizontal plane at a first position, pivoting the conveyor rolls to a second lowered position whereat the arcuately shaped portions define a supporting path having the predetermined configuration, whereby the advancing sheet sags toward the arcuately shaped portions into a partially shaped configuration and, while advancing the partially shaped sheet on the arcuately shaped portions, applying downwardly directed force against the mid region of the top surface of the sheet to urge the mid region of the sheet into engagement with the arcuately shaped portions, including advancing the sheet beneath a first arcuately shaped press member for applying the downwardly directed force, the first press member rollingly engaging the top surface of the sheet and having a flexible sleeve surrounding and rotatable about a stationary mandrel, and driving the sleeve at a peripheral speed synchronized with the rate of advance of the heated sheets on the conveyor rolls, wherein the first arcuately shaped press member is substantially coextensive with the arcuately shaped portions of the rolls and has a degree of curvature greater than the degree of curvature of the arcuately shaped portions of the rolls.

11. A method of roll forming glass sheets to a predetermined configuration including the steps of heating a flat sheet of glass to the softening point thereof, advancing the heated sheet in a substantially horizontal plane on a series of conveyor rolls having arcuately shaped supporting portions lying in a common horizontal plane at a first position, pivoting the conveyor rolls to a second lowered position whereat the arcuately shaped portions define a supporting path having the predetermined configuration, whereby the advancing sheet sags toward the arcuately shaped portions into a partially shaped configuration and, while advancing the partially shaped sheet on the arcuately shaped portions, applying downwardly directed force against the mid region of the top surface of the sheet to urge the mid region of the sheet into engagement with the arcuately shaped portions, including the steps of applying downwardly directed forces against the longitudinal marginal edge portions of the top surface of the advancing sheet following application of the force against the mid region to urge the marginal edge portions into engagement with the arcuately shaped supporting portions, and advancing the sheet beneath a second arcuately shaped press member for applying the downwardly directed forces against the marginal edge portions, the second press member rollingly engaging the marginal edge portions of the top surface of the sheet, the second press member including a freely rotatable sleeve surrounding a stationary mandrel, said sleeve rotating freely in response to frictional engagement with the top surface of the advancing sheet to apply the downwardly directed forces along the longitudinal marginal edge portions of the advancing sheet, and the second arcuately-shaped press member having a degree of curvature less than the degree of curvature of the arcuately shaped portions of the rolls.

12. A method of roll forming glass sheets to a predetermined configuration including the steps of heating a flat sheet of glass to the softening point thereof, advancing the heated sheet in a substantially horizontal plane on a series of conveyor rolls having arcuately shaped supporting portions lying in a common horizontal plane at a first position, pivoting the conveyor rolls to a second lowered position whereat the arcuately shaped portions define a supporting path having the predetermined configuration, whereby the advancing sheet sags toward the arcuately shaped portions into a partially shaped configuration and, while advancing the partially shaped sheet on the arcuately shaped portions, applying downwardly directed force against the mid region of the top surface of the sheet to urge the mid region of the sheet into engagement with the arcuately shaped portions, including advancing the sheet beneath a first arcuately shaped press member for applying the downwardly directed force, the first press member rollingly engaging the top surface of the sheet and including a freely rotatable flexible sleeve surrounding a stationary mandrel, said sleeve rotating freely in response to frictional engagement with the top surface of the advancing sheet, and including advancing the sheet beneath a second arcuately shaped press member for applying downwardly directed forces against the longitudinal marginal edge portions of the top surface of the advancing sheet following application of the force against the mid region to urge the marginal edge portions into engagement with the arcuately shaped portions, the second press member including a freely rotatable sleeve surrounding a stationary mandrel, wherein said first and second press members are vertically reciprocable, including the steps of lowering said press members from a raised position to a lowered operative position in conjunction with the pivoting of the bed of conveyor rolls from said first position to said lowered, second position, and pivoting the bed of conveyor rolls from said second position to said first position and raising said press members from said lowered operative position to said raised position after said sheet advances beyond said second press member.

13. A method of roll forming glass sheets to a predetermined configuration including the steps of heating a flat sheet of glass to the softening point thereof, advancing the heated sheet in a substantially horizontal plane on a series of conveyor rolls having arcuately shaped supporting portions lying in a common horizontal plane at a first position, pivoting the conveyor rolls to a second lowered position whereat the arcuately shaped portions define a supporting path having the predetermined configuration, whereby the advancing sheet sags toward the arcuately shaped portions into a partially shaped configuration and, while advancing the partially shaped sheet on the arcuately shaped portions, applying downwardly directed force against the longitudinal marginal edge portions of the top surface of the advancing sheet to urge the marginal edge portions into engagement with the arcuately shaped portions, including advancing the sheet beneath an arcuately shaped press member for applying the downwardly directed force, wherein the arcuately shaped press member is substantially coextensive with the arcuately shaped portions of the rolls and has a degree of curvature less than the degree of curvature of the arcuately shaped portions of the rolls whereby said arcuately shaped press member is positioned closer to said path of support at the edges than in the mid region thereof.

14. Apparatus for roll forming heated glass sheets to a predetermined configuration, including a shaping bed comprised of a series of conveyor rolls having arcuately shaped sheet supporting core portions lying in a common horizontal plane at a first position, a flexible sleeve surrounding the core portion of each conveyor roll, means drivingly rotating the sleeves about the core portions in unison for advancing a heated glass sheet across the shaping bed, means mounting said core portions for pivoted swinging movement, means for pivoting said core portions between the first position and a second lowered position whereat the arcuately shaped sheet supporting portions and sleeves thereon define a path of support having the predetermined configuration, and a first arcuately shaped press member mounted above and extending transversely of the shaping bed, said first press member engaging the mid region of the top surface of a glass sheet advancing along the shaping bed and urging the mid region into conformity with the path of support, wherein the first arcuately shaped press member has a degree of curvature greater than the degree of curvature of said arcuately shaped portions with said sleeves therearound whereby said first arcuately shaped press member is closer to said path of support in the mid region than at the edges thereof.

15. Apparatus for roll forming heated glass sheets as claimed in claim 14, wherein the first arcuately shaped press member comprises a stationary mandrel, and a flexible sleeve surrounding the mandrel for free rotation thereabout in response to frictional engagement with the surface of the advancing glass sheet.

16. Apparatus for roll forming heated glass sheets as claimed in claim 14, wherein the first arcuately shaped press member comprises a stationary mandrel, a flexible sleeve surrounding the mandrel for rotation thereabout, and means for driving the sleeve at a peripheral speed synchronized with the rate of advance of the heated sheets on the conveyor rolls.

17. Apparatus for roll forming glass sheets as claimed in claim 14, including a second arcuately shaped press member mounted above and extending transversely of the shaping bed, said second press member engaging the opposite longitudinal marginal edge portions of the top surface of a glass sheet advancing along the shaping bed after engagement by said first press member and urging the marginal edge portions downwardly into engagement with the arcuately shaped sheet supporting portions.

18. Apparatus for roll forming glass sheets as claimed in claim 17, wherein said second arcuately shaped press member comprises a stationary mandrel and a flexible sleeve surrounding the mandrel for rotation thereabout.

19. Apparatus for roll forming glass sheets as claimed in claim 17, including a base plate mounted above said path of support, and means mounting said first and second press members upon said base plate for reciprocating movement toward and away from said path of support.

20. Apparatus for roll forming glass sheets as claimed in claim 19, including a framework carrying said base plate and said conveyor rolls comprising said shaping bed, and means mounting said base plate within said framework for selectively moving said base plate toward and away from said shaping bed.

21. Apparatus for roll forming glass sheets as claimed in claim 14, including a plurality of spaced, fixed conveyor rolls positioned to receive a formed glass sheet from said shaping bed, said fixed conveyor rolls comprising a stationary core member having an arcuately curved section whose contour is substantially the same as said predetermined configuration, flexible sleeves surrounding said core members for rotation thereabout, and means for rotatably driving said sleeves about said core members in unison for conveying the formed sheets away from the shaping bed.

22. Apparatus for roll forming heated glass sheets to a predetermined configuration, including a shaping bed comprised of a series of conveyor rolls having arcuately shaped sheet supporting core portions lying in a common horizontal plane at a first position, a flexible sleeve surrounding the core portion of each conveyor roll, means drivingly rotating the sleeves about the core portions in unison for advancing a heated glass sheet across the shaping bed, means mounting said core portions for pivoted swinging movement, means for pivoting said core portions between the first position and a second lowered position whereat the arcuately shaped sheet supporting portions and sleeves thereon define a path of support having the predetermined configuration, and a first arcuately shaped press member mounted above and extending transversely of the shaping bed, said first press member engaging the mid region of the top surface of a glass sheet advancing along the shaping bed and urging the mid region into conformity with the path of support, the first arcuately shaped press member comprising a stationary mandrel, and a flexible sleeve surrounding the mandrel for free rotation thereabout in response to frictional engagement with the surface of the advancing glass sheet, the first arcuately shaped press member having a degree of curvature greater than the degree of curvature of said arcuately shaped portions with said sleeve therearound whereby said first arcuately shaped press member is closer to said path of support in the mid region than at the edges thereof.

23. Apparatus for roll forming heated glass sheets to a predetermined configuration, including a shaping bed comprised of a series of conveyor rolls having arcuately shaped sheet supporting core portions lying in a common horizontal plane at a first position, a flexible sleeve surrounding the core portion of each conveyor roll, means drivingly rotating the sleeves about the core portions in unison for advancing a heated glass sheet across the shaping bed, means mounting said core portions for pivoted swinging movement, means for pivoting said core portions between the first position and a second lowered position whereat the arcuately shaped sheet supporting portions and sleeves thereon define a path of support having the predetermined configuration, and a first arcuately shaped press member mounted above and extending transversely of the shaping bed, said first press member engaging the mid region of the top surface of a glass sheet advancing along the shaping bed and urging the mid region into conformity with the path of support, a second arcuately shaped press member mounted above and extending transversely of the shaping bed, said second press member engaging the opposite longitudinal marginal edge portions of the top surface of a glass sheet advancing along the shaping bed after engagement by said first press member and urging the marginal edge portions downwardly into engagement with the arcuately shaped sheet supporting portions, wherein said second arcuately shaped press member comprises a stationary mandrel and a flexible sleeve surrounding the mandrel for rotation thereabout, means mounting said first and second press members for selected vertical reciprocating movement toward and away from said shaping bed, and means for driving said flexible sleeve of said second press member at a peripheral speed synchronized with the rate of advance of the heated sheets on the conveyor rolls.

24. Apparatus for roll forming heated glass sheets to a predetermined configuration, including a shaping bed comprised of a series of conveyor rolls having arcuately shaped sheet supporting core portions lying in a common horizontal plane at a first position, a flexible sleeve surrounding the core portion of each conveyor roll, means drivingly rotating the sleeves about the core portions in unison for advancing a heated glass sheet across the shaping bed, means mounting said core portions for pivoted swinging movement, means for pivoting said core portions between the first position and a second lowered position whereat the arcuately shaped sheet supporting portions and sleeves thereon define a path of support having the predetermined configuration, and a first arcuately shaped press member mounted above and extending transversely of the shaping bed, said first press member engaging the mid region of the top surface of a glass sheet advancing along the shaping bed and urging the mid region into conformity with the path of support, a second arcuately shaped press member mounted above and extending transversely of the shaping bed, said second press member engaging the opposite longitudinal marginal edge portions of the top surface of a glass sheet advancing along the shaping bed after engagement by said first press member and urging the marginal edge portions downwardly into engagement with the arcuately shaped sheet supporting portions, wherein said second arcuately shaped press member comprises a stationary mandrel and a flexible sleeve surrounding the mandrel for rotation thereabout, and said second arcuately shaped press member has a degree of curvature less than the degree of curvature of said core portions with said sleeves therearound, whereby said second arcuately shaped press member is positioned closer to said path of support at the edges than in the mid region thereof.

25. Apparatus for roll forming heated glass sheets to a predetermined configuration, including a shaping bed comprised of a series of conveyor rolls having arcuately shaped sheet supporting core portions lying in a common horizontal plane at a first position, a flexible sleeve surrounding the core portion of each conveyor roll, means drivingly rotating the sleeves about the core portions in unison for advancing a heated glass sheet across the shaping bed, means mounting said core portions for pivoted swinging movement, means for pivoting said core portions between the first position and a second lowered position whereat the arcuately shaped sheet supporting portions and sleeves thereon define a path of support having the predetermined configuration, and a arcuately shaped press member mounted above and extending transversely of the shaping bed, said first press member having a degree of curvature less than the degree of curvature of said core portions with said sleeves therearound, whereby said arcuately shaped press member is positioned closer to said path of support at the edges than in the mid region thereof so as to engage the opposite longitudinal marginal edge portions of the top surface of a glass sheet advancing along the shaping bed and urge the marginal edge portions downwardly into engagement with the arcuately shaped sheet supporting portions.

* * * * *

UNITED STATES PATENT AND TRADEMARK OFFICE
CERTIFICATE OF CORRECTION

PATENT NO. : 5,395,415
DATED : March 7, 1995
INVENTOR(S) : Jody H. Akens, et. al.

It is certified that error appears in the above-identified patent and that said Letters Patent is hereby corrected as shown below:

Claim 1, line 22, delete "/f" and insert --of--.

Signed and Sealed this

Ninth Day of February, 1999

Attest:

Attesting Officer

*Acting Commissioner of Patents and Trademarks*